March 18, 1952 J. RYAN ET AL 2,589,287
METHOD OF TREATING FISH AND RESULTING PRODUCT
Filed Jan. 2, 1947 4 Sheets-Sheet 1

Inventors,
John Ryan,
William C. Wilson,
by Roberts, Cushman & Grover
Att'ys.

March 18, 1952     J. RYAN ET AL     2,589,287
METHOD OF TREATING FISH AND RESULTING PRODUCT
Filed Jan. 2, 1947     4 Sheets-Sheet 4

Fig. 3.

Inventors,
John Ryan,
William C. Wilson,
by Roberts, Cushman & Grover
Attys.

Patented Mar. 18, 1952

2,589,287

UNITED STATES PATENT OFFICE 2,589,287

METHOD OF TREATING FISH AND RESULTING PRODUCT

John Ryan, Brookline, and William C. Wilson, Beverly, Mass., assignors to Dehydrating Process Co., Boston, Mass., a corporation of Massachusetts Application January 2, 1947, Serial No. 719,782

17 Claims. (Cl. 99—111)

This invention relates to a method of effecting the complete recovery of all of the values contained in the various kinds of fish which are commercially caught and processed by the fish industry (either from salt water or from fresh water sources) and to the new and improved products thus obtained.

In the fish industry, of course, the primary purpose is to obtain fish which may be used as food for human consumption. At the same time some fish may be caught which can not serve this purpose. Such fish, whether due to the species or to their condition, must be discarded and therefore constitute a waste. On the other hand, the edible fish in the course of being dressed for use have the edible portions removed—such as fillets, steaks, cheeks, livers, oils and lights—and the remainder of the fish is discarded as waste material. A large proportion by weight of the fish caught by the fish industry, comprising whole fish of some species and the whole fish minus the edible portions of edible species, is accordingly unsuitable and incapable of being used as human food.

The recovery and treatment of fish and fish waste has heretofore been effected in various ways. It is a common characteristic of all of such procedures of the prior art, however, that they are directed to the recovery of specific parts or components of the fish. Accordingly, the product is but a part of the fish.

Moreover, during such procedures, and in the final product, the fish materials are subject to various mechanical conditions, making them difficult to handle or to store, and also susceptible to chemical and bacteriological conditions, such as putrefaction and the growth of bacteria and hence a source of pollution or contagion.

Some uses have been found for such fish wastes, as fertilizers, bait, or the like, but at such low values that a large proportion of that produced by the fish industry has been disposed of as a waste product only, often leading to offensive conditions or pollution of the surroundings. Special uses have also been found for certain selected parts of the fish, which have higher values accordingly, but these require particular procedures and are applicable only to such selected parts of the fish accordingly.

It is therefore an object of the present invention to provide a method of treating whole fish and/or whole fish from which one or more of the edible components only, as set forth above, have been removed, whereby all of the components of the fish may be simultaneously and completely converted to a condition suitable for valuable commercial uses, substantially without loss and without necessity to discard any of it. There is, therefore, no ultimate waste by the present process, and all of the raw material may be converted to a single product.

It is also an object to convert such fish waste substantially to a liquid condition, and one having certain predetermined properties.

It is a further object to convert fish waste into such a form and with such characteristic components and properties that it will lend itself economically to various commercial adaptations and uses, as new and improved products of the fish industry and other industries.

Other objects and accomplishments of the invention will appear from the following disclosure.

By the present invention it is found that whole fish—that is to say all of the component parts of which fish are composed, whether solids, such as bones, scales, fins, flesh, viscera, etc., or liquids such as water, oils, and the like—may be simultaneously and completely converted to a liquid condition so completely that there are substantially no residual solid particles in the resulting liquid product.

As a consequence, the entire "catch" of the fish industry, as a whole and/or in respect of the remainder left by the removal of any selected fraction of the several edible components, may be completely and simultaneously converted to liquid condition.

The product of applicants' invention has therefore come to be known as "liquid fish."

"Liquid fish," a new term to the fish industry and also to the fish by-products industries, relates to and designates a new product containing all of the components of whole fish—or of whole fish minus one or more of the edible components for human consumption, only, namely the flesh (fillets, steaks and cheeks), livers, oil and lights—in liquid condition and characterized by being substantially free from solids of larger particle size than that of colloids. (That is, not over 50 microns in diameter.)

The term "liquid fish" or "liquefied fish" as used in the present specification and claims will be understood to have the meaning as set forth in the foregoing definition. A characteristic feature of liquid fish is that it is capable of uniform flow, and of standing, without segregation, and that it will pass through a screen of 300 meshes per linear inch or a maximum particle size less than .050 mm.

This product may be obtained without mechanical disintegration or separation of the components of the raw fish and also without preliminary cooking operations which have in many instances been deemed to be necessary, though with large fish, such as cod and haddock, such mechanical steps are desirable. Moreover, the treatment is effected without the production of by-products at any stage of the process. The final product is altogether inoffensive, per se, and not subject to deterioration in any way.

According to the process of the invention, therefore, whole fish—either as caught or after removal of selected edible portions only as above set forth—are charged into a suitable closed container. (The fish may be partially pre-cooked and mechanically broken up, or not, as desired.) Preferably simultaneously therewith (to effect distribution throughout the charge without the necessity of additional operations), the fish are treated by the addition of a quantity of a strong acid, preferably an inorganic or mineral acid, such as sulphuric, hydrochloric, or phosphoric acid, in a sufficient quantity to impart to the charge, as a whole, an ultimate pH value of about 2.8 to 3.7. Any air in the container is removed and the charge is heated gradually to the boiling point of water, and above, under commensurate pressure, while venting the permanent gases, as through a relief valve. Thereby entrained air, absorbed, adsorbed or dissolved gases, and the like, are removed and expelled from the charge at an early stage of the operations. The heating up of the charge may be done indirectly, as by means of a steam jacket, but preferably directly as by the introduction of live steam into and throughout the acidified charge. As such conditions of heat and increased pressure are developed and maintained, the charge gradually becomes completely liquefied by conversion of the solid components to liquid form or condition, and by dissolution, or other interractions of the components of the charge. Although such conversion reactions are multifarious in kind and complex in character, they are effective upon all of the solid components of the fish to disintegrate the same and separate them, to a degree such that the sizes of substantially all of the components or ultimate reaction residues are of liquid consistency and either true liquids, in solution, or of substantially colloidal dimensions, or less. In other words, although there are some residual solid ingredients of the fish, which are not liquefied or dissolved, they are present in minute ultimate dimensions and as the intervening or associated components become completely liquid, per se, or go into solution in the liquid reagent components of the charge, these solids are released and dispersed in substantially colloidal condition.

In consequence of such conversion, the charge as a whole is liquefied and the resulting "liquid fish" product may be removed from the reaction vessel or container by continuous flow. This may be effected either by gravity flow to a receiver below or by pumping upwardly to a receiver above the treating vessel and without segregation, clogging or adhesion to the surfaces of the conduits or other mechanisms employed. Moreover, the liquid fish may then be concentrated by appropriate evaporation and removal of its volatile liquid components to any predetermined degree of fluid concentration—without loss of its characteristic liquid condition—or concentration may be carried further to a plastic condition and even to ultimate solidification and complete dryness if this should be required or desired. In the latter forms it might be described as "plastic," dried, or even solidified "liquid fish." But it is preferably maintained in its liquid condition, and with a concentration of total residual solids of 45% to 55% by weight, preferably, and at least 40% by weight.

The resulting product may be handled, stored and shipped with ease, and it may subsequently be readily employed for various purposes—but preferably in liquid form, for as such it may be handled and stored more readily and diluted as desired, without separation, if the pH value is suitably maintained. However, it may be carried to solid condition (either by drying or freezing) in which it is highly satisfactory for many uses and in conjunction with various other products.

By the present invention it is found that while the physical condition of the whole fish is thus rendered amenable to many subsequent treatments, its intrinsic values are conserved and preserved in its thus altered physical and chemical condition. In fact, the total value of the whole fish is found to be enhanced over that which is available in respect of its several separated components, and there is evidence of new values in the liquid fish which are not found in the separate components, such as the initial solids and water-soluble components, when used either separately or together. These new values are of the character of vitamin values and either manifest themselves in terms of enhanced vitamin potency of known vitamin values or constitute a new vitamin condition or component, per se.

For example, liquid fish, on account of its liquid and hence freely flowing condition may be dispersed and disseminated as in the form of a spray, without segregation or separation of its components. It may be thus mingled with feed materials of various kinds, such as dry poultry feeds, cattle feed and the like, which are usually finely ground, such as cereal grains, and may be similarly dispersed. In this way, finely divided droplets of liquid fish and dry powdery particles of feed become intimately associated and accurately proportioned and combined. The combined resulting product is, moreover, of a high feed value in proteins, organic and mineral salts, and vitamin value, as well as in its carbohydrate content—with enhanced growth and fertility factors beyond the aggregate of the several components when prepared and used separately, as cereal feeds, fish meal and stickwater or press water.

A representative example of the invention will be described in its practical application in the fish industry, upon whole fish and/or whole fish from which the edible portions for human consumption have been removed, with reference to the accompanying drawings in which.

In the practical application of the process, the fish may be of various kinds or all of one kind, depending upon the daily catch. Moreover, the charge may be of whole fish or whole fish from which the edible portions only have been removed. In either event, all of the various characteristic components of the whole fish are present and are used.

This material may be dumped into the trough 1 (Fig. 1ᵃ) or onto the floor 2, from which the screw conveyor 3, driven by motor 4, will carry it forward into the trough 1, as the latter is emptied by the bucket elevator 5 driven by motor 6. Thus the fish are delivered indiscriminately but more or less uniformly into the hopper 7, at one end of the horizontal screw conveyor 8, mounted in the closed cylindrical chamber 9. The screw conveyor 8 is mounted on shaft 10 which also has projecting vanes 11 thereon and is driven by motor 12.

Figure 1A:
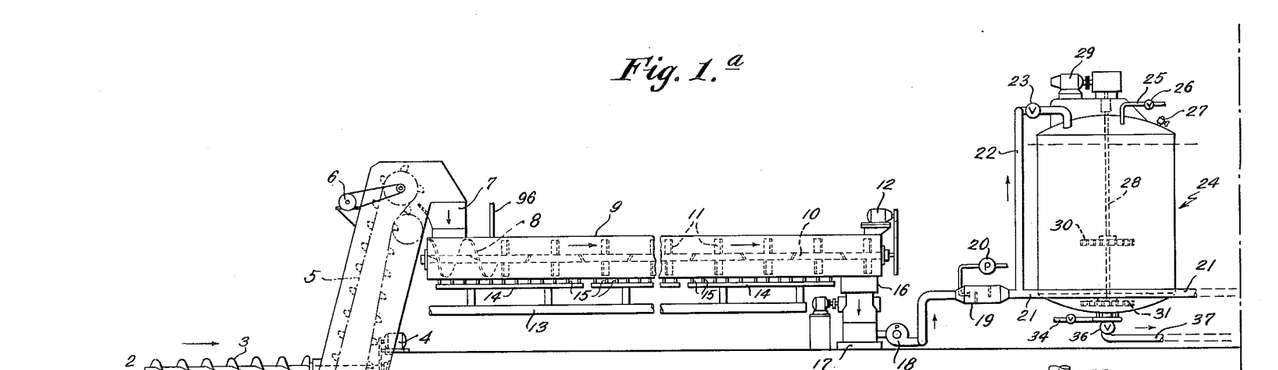
Fig. 1—which is divided into two parts 1$^a$ and 1$^b$—is an elevational longitudinal layout of the complete sequence of units required for the process, arranged from left to right in the order of progress of the fish therethrough. The fish are entered at the left, in the part 1$^a$, and thence pass continuously to the right-hand end of 1$^a$ and thence from the left of 1$^b$, therethrough to the storage tanks, at the right-hand end of 1$^b$, which receive the finished product.
Figure 1B:
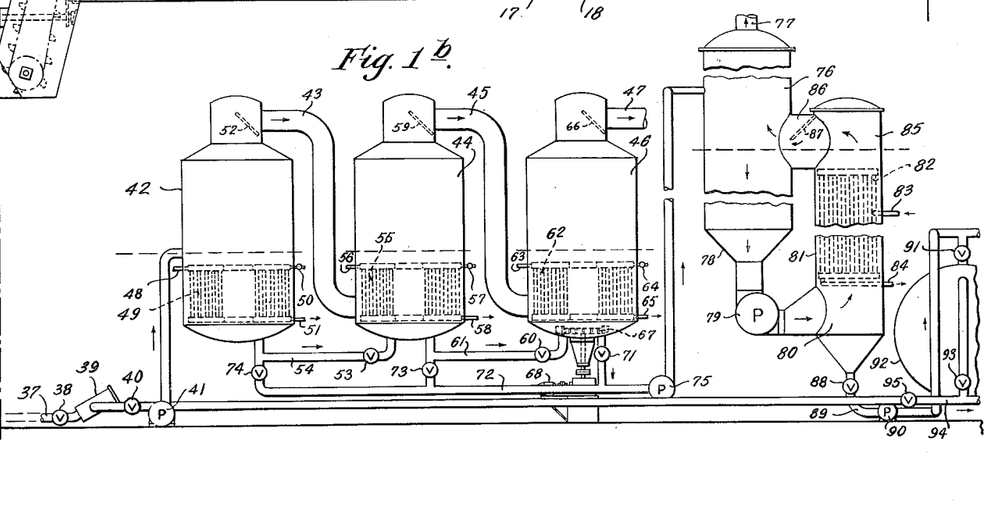

Beneath and parallel to the cylindrical chamber 9 is provided a steam line 13, connected to a series of manifolds 14, from which jets 15 lead into the bottom of the otherwise closed chamber 9.

As the fish is thus charged into and along the closed chamber 9, live steam is introduced therein, and mixed with the fish sufficiently to heat and may partially, but very slightly, pre-cook the fish. The time of passage is 10 to 20 minutes.

At the end of the chamber 9, the fish pass by gravity through a mechanical hog 16 which breaks up the fish when large—e. g., into pieces sufficient to pass through a half inch mesh screen.

The resulting pulp falls into the surge chamber 17, from which it is handled as by conveyor 18 for delivery to subsequent operations of the process.

This preliminary heating or pre-cooking treatment may be omitted, especially with small fish or the remainders of fish which have been filleted, etc. Likewise the cutting up of the fish into smaller pieces may be omitted. But with large fish, such as cod, haddock and the like, it provides a convenient preliminary mechanical conditioning of the various fishes to size, consistency and uniformity of the charge. It also facilitates the preliminary wetting and admixture of the acid and its activity upon the fresh fish.

As the charge of fish is drawn from the surge chamber 17 by pump 18, it is passed through a mixing chamber 19 in which it is contacted and mixed with a proportioned quantity of acid—for example, 4% by weight of 66° Baumé sulphuric acid, or an equivalent proportion of hydrochloric acid or phosphoric acid, in concentrated aqueous solution, by means of the injector pump 20. (However, if the apparatus is sufficiently acid-proof, it is preferable to add the acid to the fish at an earlier stage and before subjecting to heat—even before entering the pre-cooker.) The acidified charge of fish thus produced may be delivered into the line 21 (to charge a series of acid-proof lined digesters, not shown, if desired) but which is here shown as broken away, beyond the feed line 22. The latter is controlled by valve 23 and leads into the digester 24, preferably at the top.

Figure 2:
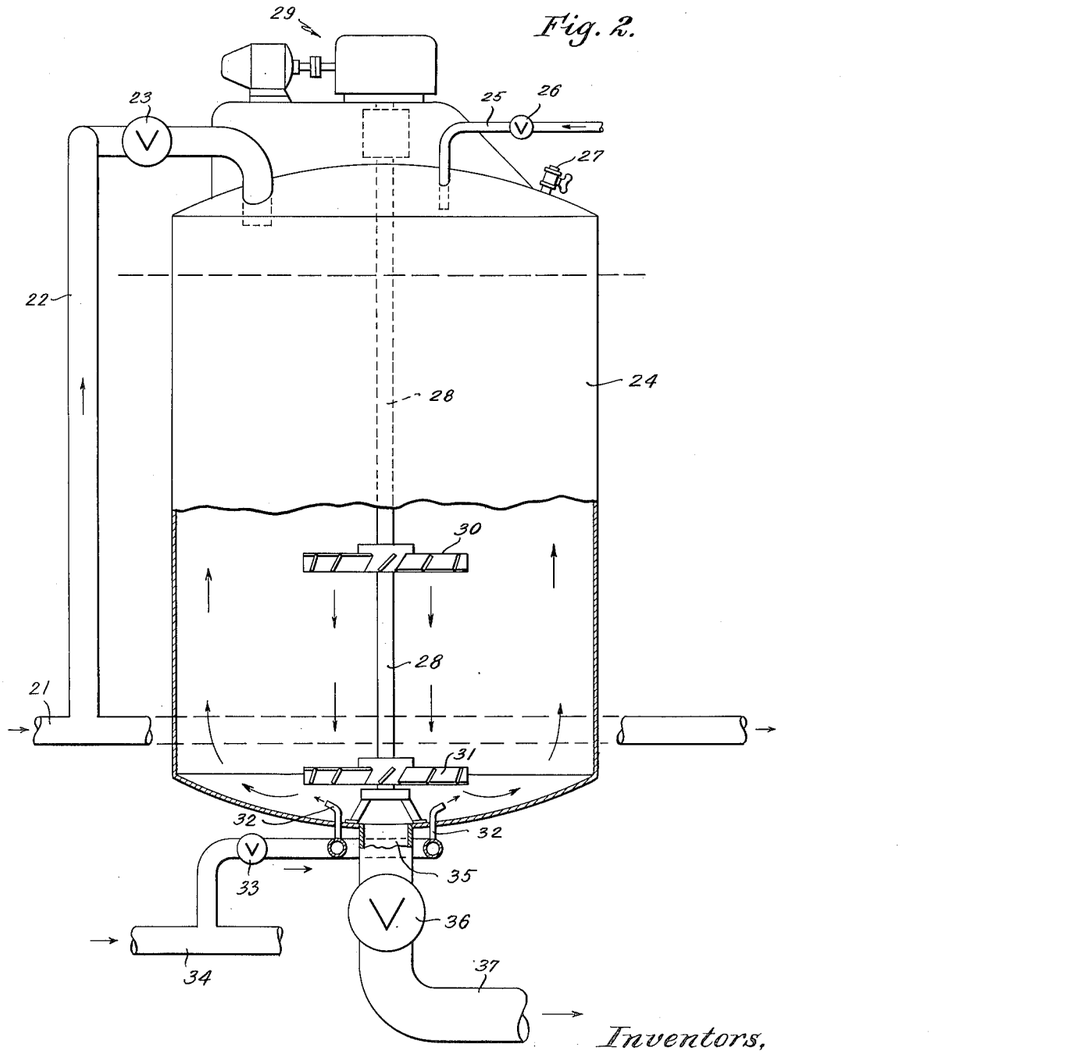
Fig. 2 is an enlarged detail elevation and cross-section, with parts broken away, of the digester in Fig. 1$^a$, showing the level of the charge therein.

During introduction of the charge into the digester, the latter is subjected to partial vacuum (e. g., 15″ vacuum) by means of the vacuum line 25 controlled by valve 26. In addition, a relief valve 27 may be provided.

The digester is provided with a stirrer shaft 28, driven by motor 29 and having agitating blades 30 thereon at about the middle of the chamber and blades 31 at the bottom of the digester chamber. The bottom of the chamber is provided with a steam inlet and distributors 32 controlled by valve 33 from the steam pressure line 34, and an outlet sump 35, with valve 36.

With the valve 36 shut off, and the escape valve 27 open or the valve 26 open, or both, the pump 18 operates to deliver the acidified charge of fish into the digester 24 until it is nearly full, as indicated by the dotted line. Valve 26, if opened, may be then closed and the valve 27 may be opened or left cracked as valve 23 is closed and steam is introduced through valve 33 and distributors 32 into the bottom of the charge, under pressure. In this way the charge is heated, any air or other gas in the digester is removed as the charge enters, and air dissolved or contained in the charge is expelled under the action of vacuum and heat, either into the vacuum line or through the cracked safety valve, as the case may be.

The digester may be advantageously covered with insulation, not shown, to reduce the amount of steam required to heat it and also to avoid the accumulation of resulting condensate in the charge. However, a considerable quantity of steam as well as air may be vented into the vacuum line and through the escape valve as the charge is brought up to temperature and pressure which is effected in about a half hour—e. g., to 300° F. or about 50 lbs. per square inch gauge pressure.

This condition is developed and maintained, together with agitation of the charge, for about 3 or 4 hours, circulating it up around the sides and down through the middle of the digester.

This merely effects the uniform action of the steam and pressure throughout the charge. The acidified condition, water, steam, temperature and pressure, combined, effect the dissolution of substantially all of the diverse components of the fish, and so intimately and completely that the small proportion of ultimately insoluble matter which will not dissolve, or which is not liquefied, is left in the small state of subdivision, in which it originally occurs in the fish body and structure, though unified and bonded by the soluble and liquid or liquefiable components which are liquefied or dissolved and thus removed therefrom in the digester.

Accordingly, by thus subjecting the entire charge of whole fish and all of the components thereof simultaneously to acid, steam, pressure and agitation, it is effective to dissolve all of the soluble, liquid and liquefiable components of the fish, and it is found that the residual solids are not only very small in amount but of substantially a colloidal order of particle size per se or less. Consequently, the charge as a whole, from a mass of solid fish or large pieces of fish, becomes uniformly liquid, of colloidal characteristics and capable of uniform flow without segregation.

At this stage, which may be indicated by marked decrease in the load upon the motor 29 (through the stirrer blades 30 and 31), the valve 33 will be closed (or nearly closed) if not previously closed, and the valve 36 will be opened. Thereupon the charge is passed from the sump 35 into the line 37 (Figs. 1ª to 1ᵇ) through value 38, strainer 39, valve 40 and pump 41. The pipe line 37 may be similarly connected with other digesters or a storage tank, not shown, to receive successive digested charges therefrom and deliver them to the evaporators.

Figure 3:
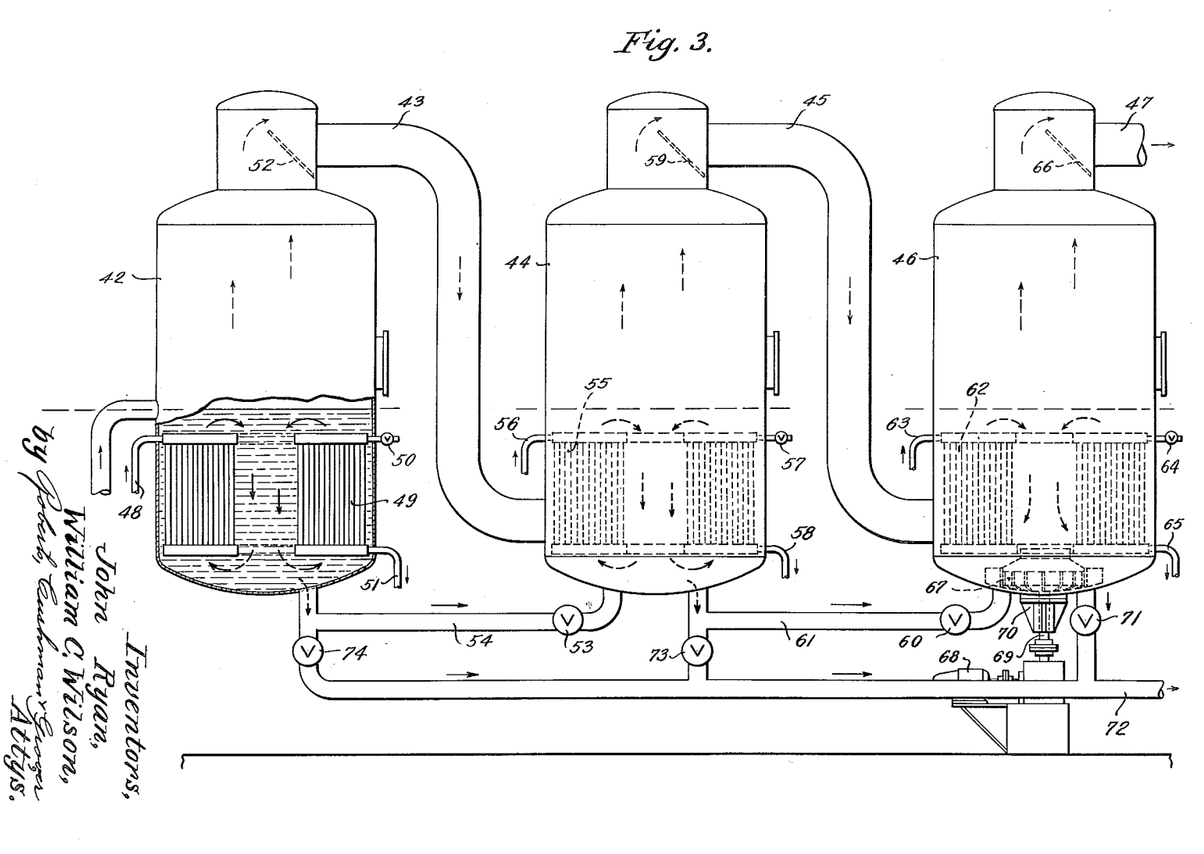
Fig. 3 is an enlarged detail elevation and cross-section, with parts broken away, of the triple effect evaporator of Fig. 1ᵇ, showing the charge passing therethrough.

The pump 41 serves to elevate and deliver the charge into the first effect 42 of a series of multiple effect evaporators, of which three are here illustrated in series. As shown in greater detail in Fig. 3, the liquid fish is delivered into the evaporator at about the middle point and brought to and maintained at this level during the evaporation operation, or the greater part of it (Fig. 3).

It will be observed that the charge, while in the digester, is under a positive pressure and at elevated temperature. This fact, and the consequent heat capacity of the charge, may be utilized to advantage in delivering the charge to the evaporator. While pumps are shown to effect the later stages of such transfer, the preliminary part of the discharge from the digester to the evaporator may be in large part accomplished by release of its own pressure by simply opening valves 36, 38 and 40. The chamber of the first effect may be at atmospheric pressure. Reduced pressure may be provided in the first effect 42 of the evaporators (as a part of the vacuum system maintained throughout the evaporators) i. e., through the vacuum line 43 leading from the first to the second effect 44, and thence through vacuum line 45 leading from the second effect to the third effect 46 and thence to the vacuum outlet 47 to an actuated vacuum pump or the like, not shown.

In this way, the charge coming from the digester, in heated condition and under pressure, is subjected to a sudden reduction of pressure and consequently a drastic "flashing" effect in the first effect evaporator, upon admission thereto, in which a large part of its water content is vaporized and withdrawn. Thus the pressure in the first effect 42 of the evaporator system may be at about atmospheric pressure, or slightly more, or considerably less, at the different stages or throughout the transfer of the charge, as desired. The last part of the charge may be withdrawn from the digester and cleared from the pipes by pump 41, whereupon the valve 40 will be closed.

The charge, in the first effect 42, is also subjected to heat by introducing steam through the steam inlet 48 into or through coil 49, having a check valve 50. The coil 49 is submerged in the charge. The water of condenstion in the coil 49 is drained off through outlet 51.

At this stage of operations, the charge is very fluid and the convective actions of heating and evaporation are sufficient to circulate it between the steam coils and maintain its uniformity, as indicated by the arrows. The water vapor from the charge is withdrawn into the vacuum outlet 43 at the top, any entrained liquids or solids therein being arrested and returned by the baffle 52.

As evaporation progresses, or fresh batches are ready for withdrawal from the digester (or digesters) the valve 53 in the pipe line 54 leading off from the bottom of the effect 42 may be opened, allowing the charge to flow (either continuously or in batch operation) into the second effect of the evaporator 44. The charge enters at the bottom and comes to a level as indicated substantially at the same height as in the first effect. It submerges the steam coil 55 therein which is provided with inlet 56, check valve 57, and condensate return 58.

In the second effect 44 the effect of the vacuum line 45 will also assist in the introduction of the charge as well as the slightly greater head from the effect 42. In this effect, for example, the pressure may be reduced from that in the first effect to approximately 14" of mercury. The temperature of the charge will also fall somewhat from the normal boiling point, e. g., to 180° F.

The heating effect of the steam coil and evaporation of water vapor will maintain circulation and uniformity of the charge. The baffle 59 will retain solids and liquid particles from escaping into the vacuum line 45.

Again, as the charge becomes concentrated, or as fresh charges are ready for evaporation and introduction from the digesters, the valve 60 in the line 61 leading from the bottom of the second effect 44 to the third effect 46 is opened, thus leading it into the bottom of the third effect and again filling it to substantially the same level as the first two effects. The steam coil 62 therein is provided with inlet 63, check valve 64 and condensate outlet 65. This coil is likewise preferably submerged in the charge, which it heats to a somewhat lower temperature than in the first two effects—e. g., 125° F.—because this effect is operated at a lower pressure—e. g., 4" of mercury (or 26" of vacuum), the vapors being removed directly to the evacuating pump (not shown) through the line 47, any solid or liquid particles therein being restrained by the baffle 66.

In this effect, owing to the lower temperature and greater evaporation effects, with corresponding concentration of the charge, a stirrer 67 may be mounted in the bottom of the chamber, driven by the motor 68 through the shaft 69 passing through the packing chamber 70.

As the charge is thus progressively concentrated by evaporation and removal of its water content, and reaches the concentration desired, it may be withdrawn by opening valve 71 leading from the bottom of the chamber of the third effect 46 and thence into the line 72. If desired for any reason, such as a delay in the output of the digester and a desire to even up the level, or average the concentrations of the charges in the several effects, the valve 73 in the line 72 leading back to the second effect 44, or the valve 74 leading back into the first effect 42, or both, may be opened and the charge thus returned to the previous effects of the multiple effect evaporator and concentrated still further.

But in the usual progressive operation of the process, the charge will be advanced continually or continuously through the line 72 by the pump 75 into the upper portion of an independent vacuum evaporator or unit 76 (Fig. 4) from which the vapors are withdrawn at the top through outlet 77 by an independent vacuum pump or the like, not shown, operated to develop such degree of vacuum therein as desired.

Figure 4:
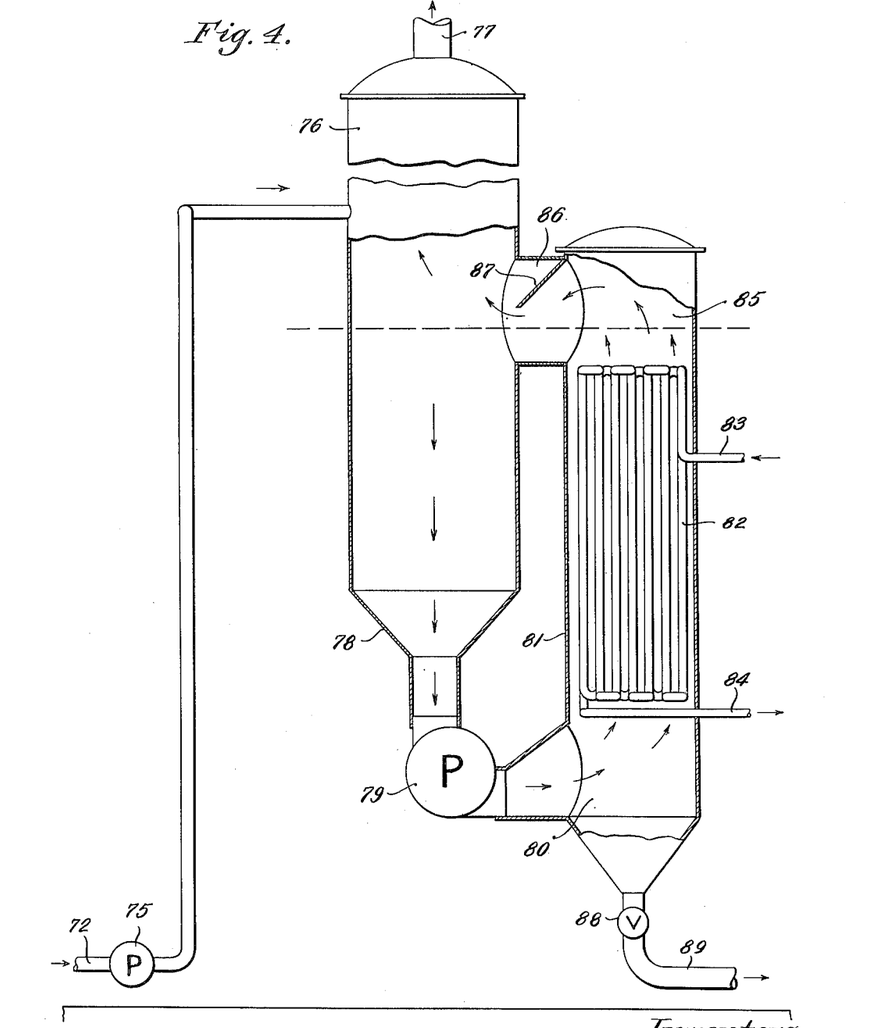
Fig. 4 is an enlarged detail elevation and cross-section, with parts broken away, of the final evaporator, of Fig. 1ᵇ, showing the charge passing therethrough.

The evaporator 76 is provided with a sloping bottom 78 leading into the pump 79 which is adapted to circulate the charge into the lower portion 80 of a second vertical chamber 81, substantially parallel to the evaporator 76, in which is mounted a steam coil 82, with inlet 83 and condensate outlet 84. The upper portion 85 of chamber 81 opens into the middle or upper portion of the evaporator chamber 76, through the wide passageway 86. The level of the charge as shown is preferably maintained sufficiently above the steam coil 82 to cover the same and also sufficiently high to flow freely through the passageway 86 into the evaporator 76. The pump 79 thus circulates the charge from the evaporator 76, upwardly through the steam coil 82 and back into the evaporator 76 through the passageway 86. The latter is provided with a baffle 87 to catch any entrained solid or liquid particles such as spray or fog and restrain its entry into the top of the evaporator and thus prevent its escape into the vacuum line 77, which may lead to a condenser or heat exchanger, not shown.

In the evaporator 76 the charge is evaporated to such consistency, specific gravity, total solids, surface tension and viscosity as may be desired. It is then withdrawn through outlet valve 88 in the bottom of the chamber 81 into the line 89 leading to the pump 90 (Fig. 1) and thence through the valve 91 into the storage tank (or tanks) 92.

An outlet valve 93 may be provided from the storage tank 92 to the line 94 leading (in the direction of the arrow) to any appropriate means for ultimate use or delivery, not shown. Alternatively, however, it may be passed through valve 95 back to the pump 41, by which it may be led (or bled) back into the evaporator 42 and therein subjected to further evaporation and concentration, if this should for any reason be desired.

The conditions of the multiple effect and final evaporators will be controlled in terms of the charge and of the properties of the product desired. Typically a vacuum of 18" of mercury in the final evaporator 76 and a temperature of about 170° F. may be maintained, for the required length of time to effect final concentration.

It will be noted that the charge of fish, from the time of its initial introduction into the process as the raw material, is immediately subjected to a sterilization treatment either by pre-cooking or by the addition of acid, or both, and that from that point until the finished product is obtained, it is not subject to the action of bacteria or living organisms of any kind. Moreover, it is both liberated from air and other permanent gases— oxidizing or reducing. Side reactions and the formation of deteriorating by-products as well as putrefaction are thus positively prevented. Furthermore, in its final finished condition, it is protected against any such subsequent changes or deterioration both mechanically and physically by its fluid condition and by its chemical condition and low pH value.

As above described, the process is conducted with reference to fish which contain low contents of fats or oils—or in which such components, if present, are left as a part of the finished product. Fish which are of high fat or oil content may be advantageously thus processed, and the fats and oils left in the product. But it may be and usually is desirable to separate them. In this event, the same apparatus may be used and the same procedure followed. But it is advantageous then to add a small proportion of the acid to the charge of fish as it is introduced into the pre-cooking stage, as at 96 (Fig. 1), sufficient to lower the pH value from its original value (usually about 6.5) to about 4.5. The treated and pre-cooked fish, reduced to small pieces if necessary in the hog at 16, may be then withdrawn from the surge tank 17 and subjected to pressing, centrifuging or like treatment to separate the oil content. The remainder of the charge (solids and liquids) may then be returned to the process which is then continued and conducted from this stage on, as above described. The separated oil as thus recovered is of high vitamin value and content and in especially favorable condition, due to the slight acidification, low heat treatment and non-destructive conditions of treatment of the fish relative to the reactive and sensitive characteristics of fish oils to physical and chemical deterioration.

The above described procedure is given in full detail as most conveniently carried out upon large fish, such as cod and haddock or the like. With these it is convenient, as indicated, to subject them to pre-cooking and/or to subsequent reduction (in the hog) to pieces of about one-half inch dimensions. This is especially desirable with fish which are both large and oily, so as to permit of separation of the oil at this stage, as above mentioned.

However, pre-cooking is not essential to the main process, and when it is conducted it should be restricted to effective temperatures below the boiling point of water and for a short time, preferably a few minutes only. A principal advantage of the pre-cooking is to raise the temperature of the fish so that when the acid is applied thereto it will spread and disseminate over and throughout the mass of fish and into the exposed surfaces of each individual fish. No appreciable amount of water or other diluent being present, the concentrated acid is thus active to attack and dissolve the most resistant components of the fish first—namely, the scales, fins, tails, and head structure—which are both moist and uniformly warm or hot throughout such surfaces.

It is therefore to be understood that the fish, if non-oily or if the oil and fats are not to be separated, may be delivered directly into the digester 42 (without preliminary heating, cooking, acidification or moistening), the acid added thereto in the required amount, and the succeeding steps of the process carried out as above described successfully and satisfactorily.

Likewise, although a continuous process and suitable apparatus therefor has been described as the preferred and economically most advantageous adaptation of the invention, it is clear that it could be carried out in batch operations and even in separated stages as to time and place. Thus, the fish could be treated with acid, centrifuged to remove the oil and then stored, on the vessel in which they had been caught, and while at sea. They could then be subsequently digested and concentrated in a suitable plant ashore. Other adaptations will occur to those familiar with the fishing and by-product industries.

It is also to be understood that, for a more effective preliminary separation and recovery of the oil or components, the fish may be pre-cooked or otherwise treated and then pressed to remove the liquid components from the solid components. The liquid components may then be separated, as by passing through a centrifuge to remove the oils or oils and fats, and the residual aqueous and suspended solids fraction may be returned to and mixed with the solids components of the press cake. The resulting mixture may then be subjected to the succeeding steps of the process, as above described, by acidifying to the required pH value, digesting, evaporating and concentrating, etc., as already set forth.

In the foregoing description of the procedure and apparatus, the acid is recommended to be added to the charge as it is introduced to the digester. It is also pointed out that in some cases a preliminary partial acidification of the charge may be effected—e. g., to lower the pH from 6.5 to approximately 4.5 as the charge is introduced into the pre-cooker. These precautions are advisable, since the pre-cooker is not readily made acid resistant and a pH value as low as 4.5 will not attack many construction materials, from which it may be fabricated, while a pH value of 2.8 to 3.7 would destroy them. The digester construction, on the other hand, may be readily lined with acid-proof brick or the like throughout and thus resist the activity of the more acidic charge.

However, if the pre-cooker were made with an acid-proof lining, it would be desirable and advantageous to bring the charge at this point to the required pH of 2.8 to 3.7, instead of just before introducing it into the digester. A similar effect of preliminary complete acidification would, of course, be produced by the procedure above suggested, in which pre-cooking is omitted and the fish as received are charged directly into the digester along with the full amount of the acid or acids to be used to lower the pH value to the desired degree of 2.8 to 3.7.

A typical product of liquid fish, prepared and concentrated in accordance with the procedure as above described, presents the following characteristics and properties:

Specific gravity at 75° F. from 1.15 to 1.26, averaging 1.20 to 1.24.

Viscosity—as determined in a Stormer torsion viscosimeter, with a 600 gram weight, at 75° F.—high, 150 revolutions per minute, low 260 revolutions per minute.

Solubility

Insoluble organic matter 11.90% (retained by filter paper).

Insoluble mineral matter 4.90.

Particle size

All to pass 100 mesh standard screen.
Retained by 300 mesh bolting cloth:

Organic 0.025%
Inorganic 2.60%

The particle size of the larger particles of suspended mineral matter are, therefore, as a matter of comparison, smaller than that of salt crystallized during the evaporation of soap lye, and of the order of colloidal dimensions and less, or else in liquid condition or in solution.

*Typical analysis of liquid fish, as produced by the foregoing procedure*

| | Per cent | Per cent | Per cent |
|---|---|---|---|
| Total Residual Solid Content (i. e., upon evaporation to dryness) | 52.30 | 50.20 | 46.00 |
| Protein (N×6.25) | 31.40 | 32.50 | 30.50 |
| Oil | 5.01 | 3.81 | 2.50 |
| Ash | 13.20 | 13.80 | |
| Calcium (Ca) | 3.24 | 3.20 | 3.30 |
| Phosphorus (P) | 1.71 | 1.59 | 1.70 |

In deep sea fishing, which may involve rather prolonged voyages at sea, it is frequently necessary to carry out the dressing operation of removing the entrails of the fish and laying down the dressed fish on the vessel and while at sea. In such cases, the dressed fish are brought into port and the edible portions subsequently removed. When this is done, the remainder of the fish constitutes the whole fish minus both the edible portion and minus the viscera. The process may be carried out as above, but the product will thereupon correspond to "liquid fish" minus the constituents of the viscera as well as minus the edible portions.

We claim:

1. Method of making liquefied fish, comprising the steps of subjecting all of the components of fish simultaneously to contact with an acid, and to an atmosphere of steam at elevated temperature and pressure, and continuing these conditions until the charge is reduced substantially completely to a particle size below approximately 50 microns.

2. Method of making liquefied fish, comprising the steps of subjecting all of the components of fish simultaneously to contact with an acid, to effect a pH value of 2.8 to 3.7, and to an atmosphere of steam at elevated temperature and pressure, and continuing these conditions until the charge is reduced substantially completely to a particle size below approximately 50 microns.

3. Method of making liquefied fish, comprising the steps of subjecting all of the components of fish simultaneously to contact with sulphuric acid, and to an atmosphere of steam, at elevated temperature and pressure, and continuing these conditions until the charge is reduced substantially completely to a particle size below approximately 50 microns.

4. Method of making liquefied fish, comprising the steps of subjecting all of the components of fish simultaneously to contact with sulphuric acid to effect a pH value of 2.8 to 3.7 and to an atmosphere of steam, at elevated temperature and pressure, and continuing these conditions until the charge is reduced substantially completely to a particle size below approximately 50 microns.

5. Method of making liquefied fish, comprising the steps of subjecting all of the components of fish simultaneously to contact with an acid and to an atmosphere of steam, at elevated temperature and pressure, and continuing these conditions until the charge is reduced substantially completely to a particle size below approximately 50 microns and subjecting the charge to vacuum evaporation.

6. Method of making liquefied fish, comprising the steps of subjecting all of the components of fish simultaneously to contact with an acid and to an atmosphere of steam, at elevated temperature and pressure, and continuing these conditions until the charge is reduced substantially completely to a particle size below approximately 50 microns and subjecting to evaporation to a residual solids content of at least 40% by weight.

7. Method of making liquefied fish, comprising the steps of subjecting all of the components of fish simultaneously to contact with an acid and to an atmosphere of steam, at elevated temperature and pressure, and continuing these conditions until the charge is reduced substantially completely to a particle size below approximately 50 microns and subjecting to evaporation to a residual solids content of 45% to 55% by weight.

8. Method of making liquefied fish, comprising the steps of subjecting the components of the fish to simultaneous contact with an acid and to an atmosphere of steam at elevated temperature and pressure, and continuing these conditions until the charge is reduced substantially completely to a colloidal condition.

9. Method of making liquefied fish, comprising the steps of subjecting the components of the fish, minus edible portions only, to simultaneous contact with an acid and to an atmosphere of steam at elevated temperature and pressure, and continuing these conditions until the charge is reduced substantially completely to a colloidal condition.

10. Method of making liquefied fish, comprising the steps of subjecting the components of the fish, minus the edible portions and minus the viscera thereof, to simultaneous contact with an acid and to an atmosphere of steam at elevated temperature and pressure, and continuing these conditions until the charge is reduced substantially completely to a colloidal condition.

11. Method of making liquefied fish, comprising the steps of subjecting the components of the fish, minus edible portions only, to simultaneous contact with an acid and to an atmosphere of steam at elevated temperature and pressure, and continuing these conditions until the charge is reduced substantially completely to a particle size below approximately 50 microns.

12. Method of making liquefied fish, comprising the steps of subjecting the components of the fish, minus the edible portions and minus the viscera thereof, to simultaneous contact with an acid and to an atmosphere of steam at elevated temperature and pressure, and continuing these conditions until the charge is reduced substantially completely to a particle size below approximately 50 microns.

13. Method of making liquefied fish, comprising the steps of subjecting all of the components of fish simultaneously to contact with hydrochloric acid and to an atmosphere of steam at elevated temperature and pressure, and continuing these conditions until the charge is reduced substantially completely to a particle size below approximately 50 microns.

14. Method of making liquefied fish, comprising the steps of subjecting all of the components of fish simultaneously to contact with phosphoric acid and to an atmosphere of steam at elevated temperature and pressure, and continuing these conditions until the charge is reduced substantially completely to a particle size below approximately 50 microns.

15. Method of making liquefied fish, comprising the steps of subjecting all of the components of fish simultaneously to contact with hydrochloric acid, to effect a pH value of 2.8 to 3.7, and to an atmosphere of steam, at elevated temperature and pressure, and continuing these conditions until the charge is reduced substantially completely to a particle size below approximately 50 microns.

16. Method of making liquefied fish, comprising the steps of subjecting all of the components of fish simultaneously to contact with phosphoric acid, to effect a pH value of 2.8 to 3.7, and to an atmosphere of steam, at elevated temperature and pressure, and continuing these conditions until the charge is reduced substantially completely to a particle size below approximately 50 microns.

17. Liquefied fish characterized by containing all of the natural components of fish in solution and suspension, said components comprising fish fluids, flesh, bone, tails, head, fins, scales and cartilage, concentrated to a total solids content of at least 40% and substantially completely of a particle size below 50 microns.

JOHN RYAN.
WILLIAM C. WILSON.

REFERENCES CITED

The following references are of record in the file of this patent:

UNITED STATES PATENTS

| Number | Name | Date |
|---|---|---|
| 1,101,513 | Adler | June 23, 1914 |
| 1,442,339 | Hildebrandt | Jan. 16, 1923 |
| 2,049,576 | Ungnade | Aug. 4, 1936 |
| 2,406,249 | Parfentjev | Aug. 20, 1946 |
| 2,512,375 | Parfentjev | June 20, 1950 |

FOREIGN PATENTS

| Number | Country | Date |
|---|---|---|
| 279,985 | Great Britain | Nov. 10, 1927 |
| 284,636 | Great Britain | July 5, 1928 |

OTHER REFERENCES

"Chemical and Engineering News," May 30, 1949, page 1584.